United States Patent
Larson

(10) Patent No.: US 10,557,774 B2
(45) Date of Patent: Feb. 11, 2020

(54) MATTRESS FIRMNESS TESTING PROCESS AND SYSTEM

(71) Applicant: Christopher James Larson, Valley Springs, SD (US)

(72) Inventor: Christopher James Larson, Valley Springs, SD (US)

(73) Assignee: Comfort King of Souix Falls, Inc., Souix Falls, SD (US)

( * ) Notice: Subject to any disclaimer, the term of this patent is extended or adjusted under 35 U.S.C. 154(b) by 0 days.

(21) Appl. No.: 15/997,103

(22) Filed: Jun. 4, 2018

(65) Prior Publication Data

US 2019/0285515 A1 Sep. 19, 2019

Related U.S. Application Data

(60) Provisional application No. 62/642,841, filed on Mar. 14, 2018, provisional application No. 62/655,388, filed on Apr. 10, 2018.

(51) Int. Cl.
| | |
|---|---|
| *G01M 99/00* | (2011.01) |
| *A47C 27/14* | (2006.01) |
| *B25J 13/08* | (2006.01) |
| *B25J 11/00* | (2006.01) |
| *A47C 31/12* | (2006.01) |

(52) U.S. Cl.
CPC ......... *G01M 99/001* (2013.01); *A47C 27/148* (2013.01); *A47C 31/123* (2013.01); *B25J 11/00* (2013.01); *B25J 13/085* (2013.01)

(58) Field of Classification Search
CPC .. G01M 99/001; A47C 27/148; A47C 31/123; B25J 11/00; B25J 13/085

USPC .......................................................... 73/788
See application file for complete search history.

(56) References Cited

U.S. PATENT DOCUMENTS

| | | | |
|---|---|---|---|
| 4,004,457 A | 1/1977 | Eide et al. | |
| 4,140,008 A * | 2/1979 | Golembeck | A47C 31/123 73/161 |
| 5,465,605 A * | 11/1995 | Smith | G01N 3/32 73/7 |
| 6,131,469 A | 10/2000 | Wortman et al. | |
| 6,786,083 B1 | 9/2004 | Bain et al. | |
| 9,212,982 B2 | 12/2015 | Wolkin et al. | |

(Continued)

FOREIGN PATENT DOCUMENTS

| | | |
|---|---|---|
| DE | 10029515 | 12/2001 |
| EP | 457412 | 5/1990 |

*Primary Examiner* — Max H Noori
(74) *Attorney, Agent, or Firm* — Quinn IP Law

(57) ABSTRACT

A system for evaluating failure of a used mattress includes a test device and computerized test device control module. The test device includes a plunger arm, a control motor attached to a first end of the plunger arm and configured to selectively extend and retract the plunger arm, and a platen attached to an end of the plunger arm distal from control motor. The control module includes a computerized processor, operating programming to evaluate the failure of the mattress. The programming includes controlling extension of the plunger arm, monitoring firmness in the mattress based upon force applied by the platen on the mattress and displacement of the plunger arm, monitoring a threshold firmness value for comparison, comparing the threshold firmness value to the monitored firmness, and generating a result of the comparison indicating the failure of the mattress.

4 Claims, 9 Drawing Sheets

(56) References Cited

U.S. PATENT DOCUMENTS

2005/0140358 A1* 6/2005 Kennedy ............... B60N 2/002
  324/207.12
2010/0192698 A1* 8/2010 Hansen ................ B60N 2/002
  73/779
2014/0237786 A1* 8/2014 Rawls-Meehan ...... A47C 7/027
  29/91.1

* cited by examiner

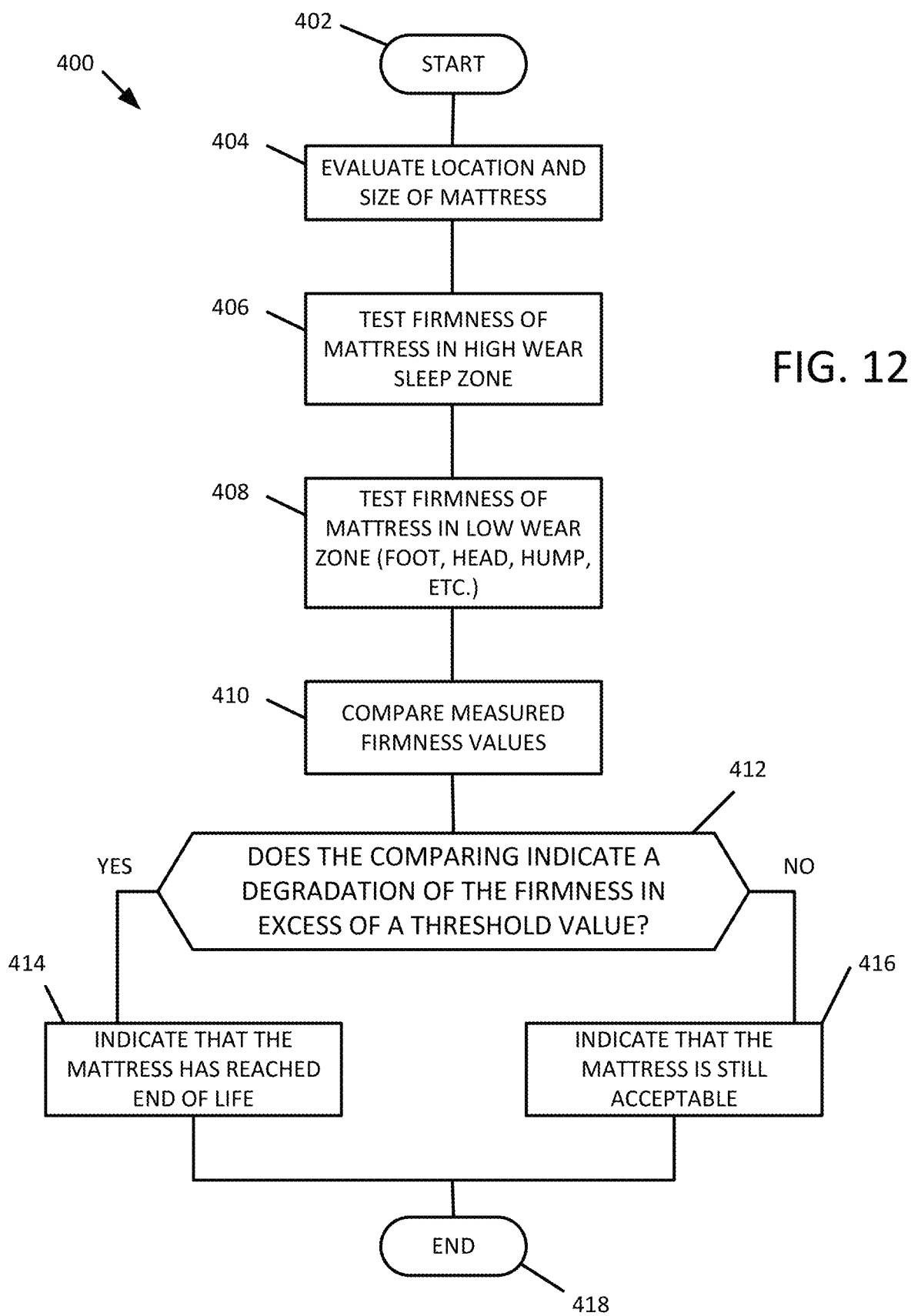

MATTRESS FIRMNESS TESTING PROCESS AND SYSTEM

CROSS REFERENCE TO RELATED APPLICATIONS

This disclosure claims priority to and the benefit of U.S. Provisional Application No. 62/655,388 filed on Apr. 10, 2018 and additionally of U.S. Provisional Application No. 62/642,841 filed on Mar. 14, 2018, both of which are hereby incorporated by reference.

TECHNICAL FIELD

This disclosure is related to testing a mattress, in particular, to a process and system for measuring displacement in the mattress to determine mattress wear and failure based upon loss of firmness.

BACKGROUND

The statements in this section merely provide background information related to the present disclosure. Accordingly, such statements are not intended to constitute an admission of prior art.

Methods and processes are known to test mattresses, for example, to test for broken springs or torn foam. Known tests evaluate new mattresses for performance or an improperly assembled mattress affecting overall firmness of the mattress resulting from non functional springs or that foams or other cushioning layers have insufficient support or firmness. Known manufacturing processes include wear simulation processes. However, such processes do not accurately simulate the gradual degradation of the mattress firmness in areas where a person actually lays upon the mattress.

SUMMARY

A system for evaluating failure of a used mattress includes a test device and computerized test device control module. The test device includes a plunger arm, a control motor attached to a first end of the plunger arm and configured to selectively extend and retract the plunger arm, and a platen attached to an end of the plunger arm distal from control motor. The control module includes a computerized processor, operating programming to evaluate the failure of the mattress. The programming includes controlling extension of the plunger arm, monitoring firmness in the mattress based upon force applied by the platen on the mattress and displacement of the plunger arm, monitoring a threshold firmness value for comparison, comparing the threshold firmness value to the monitored firmness, and generating a result of the comparison indicating the failure of the mattress.

BRIEF DESCRIPTION OF THE DRAWINGS

One or more embodiments will now be described, by way of example, with reference to the accompanying drawings, in which:

FIG. 12 illustrates an exemplary embodiment of the disclosed process to test a mattress in a flow chart, in accordance with the present disclosure.

DETAILED DESCRIPTION

Figure 1:
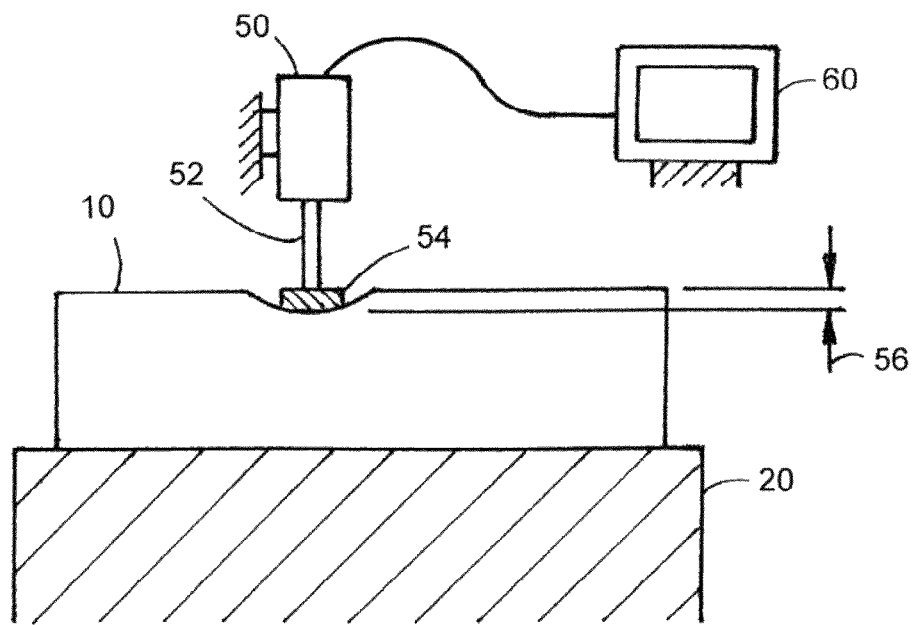
FIG. 1 illustrates in side view an exemplary testing device applying pressure upon a mattress and measuring displacement in the mattress resulting from the pressure, in accordance with the present disclosure.

A process and system for testing failure or wear within a mattress is disclosed including measuring displacement in the mattress, in one exemplary embodiment, measuring displacement responding to approximately half of a typical person's weight applied at a point or zone on the mattress where a typical person's hip would rest upon the mattress. In another exemplary embodiment, sleep zones which support a majority of a person's weight upon the mattress can be tested to evaluate failure or wear within a mattress. Whereas known testing is useful test new mattresses, testing firmness ratings for the overall mattress, the disclosed processes are useful to test and evaluate a used mattress and determine whether the mattress has reached an end of its useful life. Instead of testing the overall mattress, the disclosed system and process tests particular areas of the mattress which experience the most wear during normal use of the mattress and evaluate whether springs have broken or foams or other cushioning layers have lost support or firmness.

Modern foams used in mattresses tend to lose firmness before appreciably losing height. This means that one can look at a mattress, and although the foam has been materially degraded such that the user should stop sleeping on it, the undeformed or unloaded surface of the mattress still appears flat. The disclosed system and process provides an evaluation method to determine whether the mattress has reached an end of its useful life.

The system uses SoftSpot or firmness testing procedures to determine precisely the "Displacement at Load". An exemplary process includes steps follows.

First, an Indentation Load Deflection (ILD) number is determined for each of a set of current unique models, which can be listed on the price cards and on advertising for customers to use to help them find the right level of softness/firmness for their preferences. This ILD number is calculated by dividing a given load number (90 lbs. is given as one exemplary value) by the amount of Displacement (inches). So, an exemplary mattress that allowed the platen to sink in three inches at 90 lbs. would score a 30 ILD.

Second, a prospective customer who is shopping for a new bed is assisted to determine the Firmness rating (ILD) on their current bed, in order to figure out what precisely they do not like about it, to make more clear the direction they should go in for their new one.

Third, a customer's mattress in two to four different areas of the mattress is tested to determine the exact severity of the "SoftSpot", or "loss of firmness." Under one exemplary business model, any softening of more than 20% can result in warranty coverage of materials replacement.

Fourth, an ILD is determined for the customer mattress. In one exemplary process, a "comfort adjustment" adjustment can be performed upon the mattress. A precise number for the softness or firmness increase can be determined or estimated and provided to the customer.

The ILD, once determined, can be compared to a stock or desired value for a particular brand and model of mattress. The ILD, in another embodiment, can be compared with the ILD in different areas of the mattress to determine location and severity of SoftSpots forming in the mattress.

The included diagnostic process and the disclosed system enabling the disclosed process can be used to a number of ends correlating to the failure of the tested mattress. In one example, the process can be used to diagnose a mattress at the end of its useful life. This diagnosis can be used to advise a customer to dispose of the mattress. This diagnosis can be used to operate a warranty program, with an exemplary manufacturer offering to diagnose and warrant mattresses remaining still acceptable for a certain period of time. Such a program can provide the manufacturer with a competitive sales advantage over other manufacturers. In another example, the process can be used to diagnose a need to repair or operate a comfort adjustment upon the mattress. In such a repair or adjustment process, a facility can open the mattress and replace or bolster padding in sleep zones of a mattress to bring it back into acceptable operation. In one embodiment, the diagnostic process can include one or only a few measurements in a sleep zone, with the deflection value at a given load being useful to describe to the repair team how much bolstering the mattress needs. In another example, a more detailed diagnostic can be performed, and a numerical or color coded map can be provided of the mattress to the repair team, such that a customized insert can be created to bring the mattress back to a near new condition. Throughout the disclosure, any mention of a mattress being end of life or a mattress being diagnosed as being a warranty failure or ready for repair should be understood as substantially interchangeable conditions.

A comfort adjustment can take many forms. For example, a manufacturer can open the mattress and replace or adjust springs and/or foam within the mattress. Additionally or alternatively, the manufacturer can add firmer or softer material layers to change overall comfort/support, including adding material to specific areas, such as at sleep zones. As part of performing a comfort adjustment, the disclosed system can provide a softness or firmness map to the persons performing the comfort adjustment, such that targeted changes can be made to various springs within the mattress to bring the mattress back to an acceptable state.

The disclosed process can be operated within a computerized module, for example, including programming to control a test arm, monitor depression in a mattress as a function of force applied, monitor a threshold value for comparison, compare the threshold value to the monitored depression, and generate or display a result of the comparison.

According to one embodiment of the disclosure, an important criterion to judge the wear or degradation of a mattress can be based upon how much force resistance the springs and foam of the mattress return upon a depressive force placed upon the mattress. A new mattress in pristine condition has a best or optimal force resistance for that mattress. Through use of the mattress, that force resistance decreases over time, through wear and degradation of both the springs and foam of the mattress. However, this wear is not uniform across the surface of the mattress. Areas of heavy use are heavily degraded. Areas with little or no use can remain at the optimal condition. As a result, one can judge the wear upon the mattress and make a determination whether the mattress is in need of comfort adjustment or replacement by comparing force resistance in areas of heavy use vs. force resistance in areas of light or no use.

Referring now to the drawings, wherein the showings are for the purpose of illustrating certain exemplary embodiments only and not for the purpose of limiting the same, FIG. 1 illustrates in side view an exemplary testing device applying pressure upon a mattress and measuring displacement in the mattress resulting from the pressure. Mattress 10 is illustrated situated upon an exemplary flat and rigid block 20. Testing device 50 is illustrated including plunger arm 52 connected to a platen 54 configured to press against mattress 10. Exemplary testing device 50 includes mechanics configured to enable plunger arm 52 to be extended and force to be applied to platen 54. Additionally, testing device 50 can include measurement sensors or equipment necessary to determine both how much mattress 10 has been displaced by platen 54 and how much force is applied at any given displacement. Displacement value 56 is illustrated showing how far platen 54 has been depressed into mattress 10 as compared to an initial flat, undepressed surface of mattress 10.

Test device control module 60 is illustrated electronically connected to test device 50. It will be appreciated that module 60 can be attached to test device 50 with a physical cable or bus, or module 60 can communicate wirelessly with test device 50. Module 60 is a computerized device including a processor, a hard drive, and random access memory, module 60 being configured to operate programmed code or programmed instructions. Module 60 can be connected to input and output devices configured to enable a user to control the testing process and to receive output results from the process.

Platen 54 is illustrated. In another embodiment, a roller device can be located upon an end of plunger arm 52. The test device 50 or mattress 10 can be moved in one direction or in two directions to evaluate displacement across a face of mattress 10 at a given load.

A non-limiting exemplary testing unit that can be utilized within or as part of test device 50 includes an ADMET® eXpert 5000 Series Modular Universal Testing System.

Figure 2:
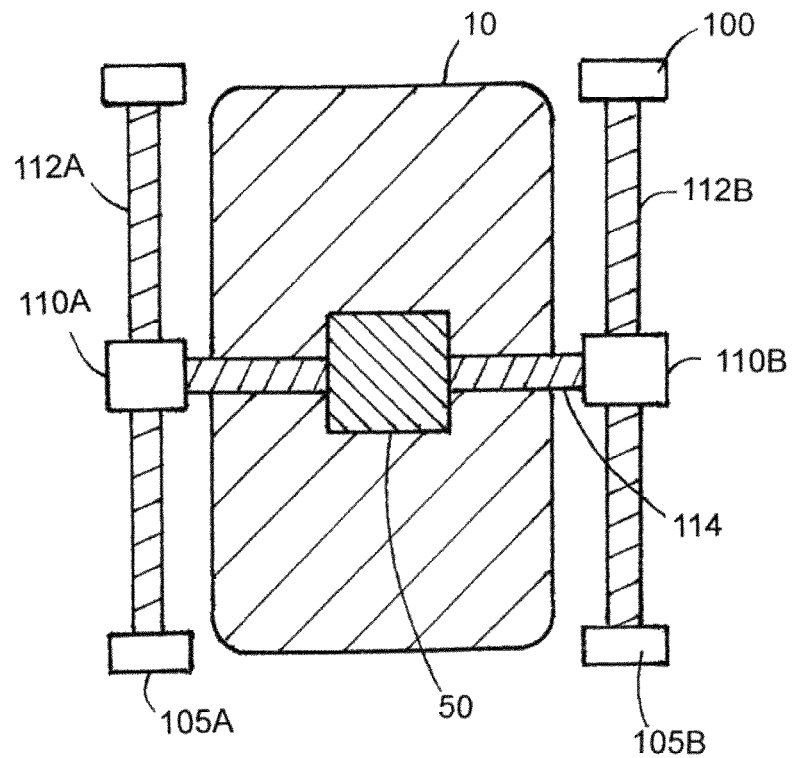
FIG. 2 illustrates in a top view an exemplary embodiment of the testing device of FIG. 1, wherein the testing device is mounted to a two dimensional traversing system configured to move the testing device around a face of the mattress, in accordance with the present disclosure.

FIG. 2 illustrates in a top view an exemplary embodiment of the testing device of FIG. 1, wherein the testing device is mounted to a two dimensional traversing system configured to move the testing device around a face of the mattress. Two dimensional traversing system 100 is illustrated including mechanical mechanisms useful to move test device 50 to various locations over a surface of mattress 10. Any number of two dimensional traversing systems are envisioned, and the disclosure is not intended to be limited to the particular examples provided herein. Two exemplary electrical motors 105A and 105B are illustrated connected to rotating threaded shafts 112A and 112B, respectively. As motors 105A and 105B turn shafts 112A and 112B, shaft carrier/electrical motor units 110A and 110B are moved vertically in FIG. 2, thereby controlling a vertical location of test device 50. As shaft carrier/electrical motor units 110A and 110B turn connected rotating threaded shaft 114, thereby moving test device 50 horizontally in the figure. In this way, system 100 can move test device 50 to any location on the surface of mattress 10, where test device 50 can be activated to depress the mattress at that location and determine a softness or firmness value for that location on the mattress.

Two dimensional traversing system 100 is intentionally illustrated as a simplistic system. One having skill in the art will appreciate that any computer controlled electronic system useful to traverse test device 50 over mattress 10, keeping the test device 50 perpendicular to the mattress surface and keeping the test device 50 at a static vertical location over the mattress 10 can be used as system 100. In another embodiment, a robotic arm, such as is manufactured by the company FANUC®, can be used in place of traversing system 100, with test device 50 located on an end of the articulate arm.

In another embodiment, a manually manipulated traversing system can be utilized, with an operator visually selecting location for the heavy use and light use tests, with the test device still operating the tests with automated depressions once the user selects the locations.

Figure 3:
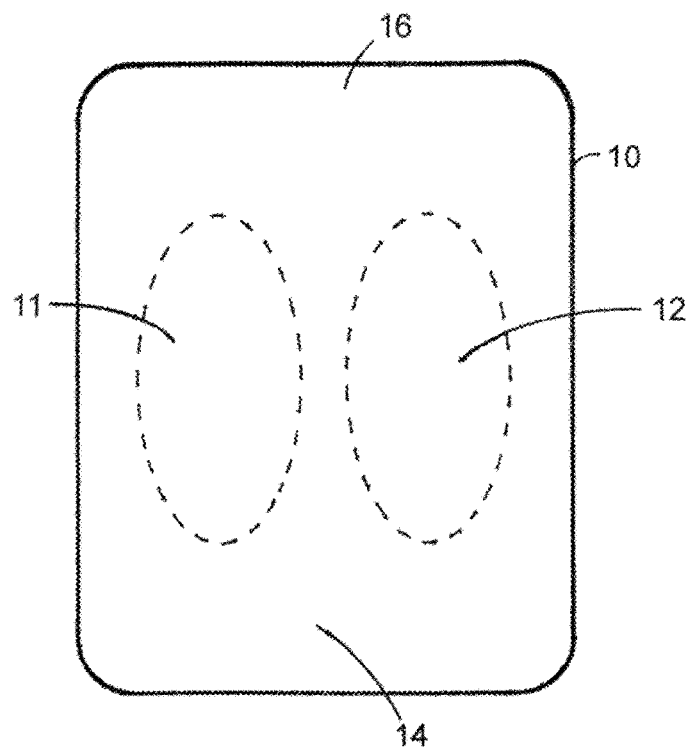
FIG. 3 illustrates in a top view a queen sized mattress and typical areas of heavy and light use, in accordance with the present disclosure.

FIG. 3 illustrates in a top view a queen sized mattress and typical areas of heavy and light use. Queen sized mattress 10 is illustrated. Zones 11 and 12 where people typically sleep upon mattress 10 are illustrated with dotted lines. These areas can be termed "sleep zones." These areas can be test areas for heavy use. Near the foot of the bed, zone 14 illustrates an area on mattress 10 where no one typically sleeps. Near at head of the bed, zone 16 illustrates another area on mattress 10 where no one typically sleeps. These areas can be test areas for light or no use. By applying a force in, across, or through the heavy use areas and recording the force resistance and also applying the force in, across, or through the light or no use area, one can compare the optimal force resistance of the mattress to the force resistance in the areas of heavy wear, and a certain percentage difference in force resistance between the optimal value, determined in the light use area or areas 14 and 16 and the value under heavy wear in area or areas 11 and 12, can be used a warranty or comfort adjustment threshold.

Figure 4:
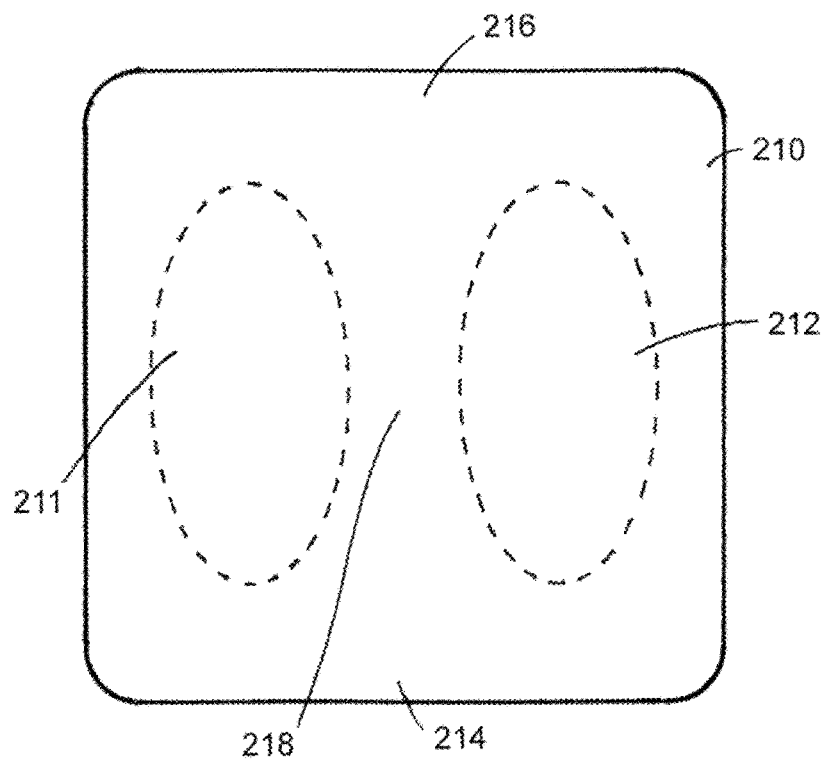
FIG. 4 illustrates in a top view a king sized mattress and typical areas of heavy and light use, in accordance with the present disclosure.

FIG. 4 illustrates in a top view a king sized mattress and typical areas of heavy and light use. King sized mattress 210 is illustrated. Zones 211 and 212 where people typically sleep upon mattress 210 are illustrated with dotted lines. These areas can be test areas for heavy use. Near the foot of the bed, zone 214 illustrates an area on mattress 210 where no one typically sleeps. Near at head of the bed, zone 216 illustrates another area on mattress 210 where no one typically sleeps. Further, zone 218 illustrates an area between zones 211 and 212 where no one typically sleeps. Zone 218 can be termed a "hump" zone or a zone where the firmness of the zone creates a notable hump between the two degraded sleep zones. These areas can be test areas for light or no use. By applying a force in, across, or through the heavy use areas and recording the force resistance and also applying the force in, across, or through the light or no use area, one can compare the optimal force resistance of the mattress to the force resistance in the areas of heavy wear, and a certain percentage difference in force resistance between the optimal value, determined in the light use area or areas 214, 216, and 218 and the value under heavy wear in area or areas 211 and 212, can be used as a warranty or comfort adjustment threshold.

Figure 5:
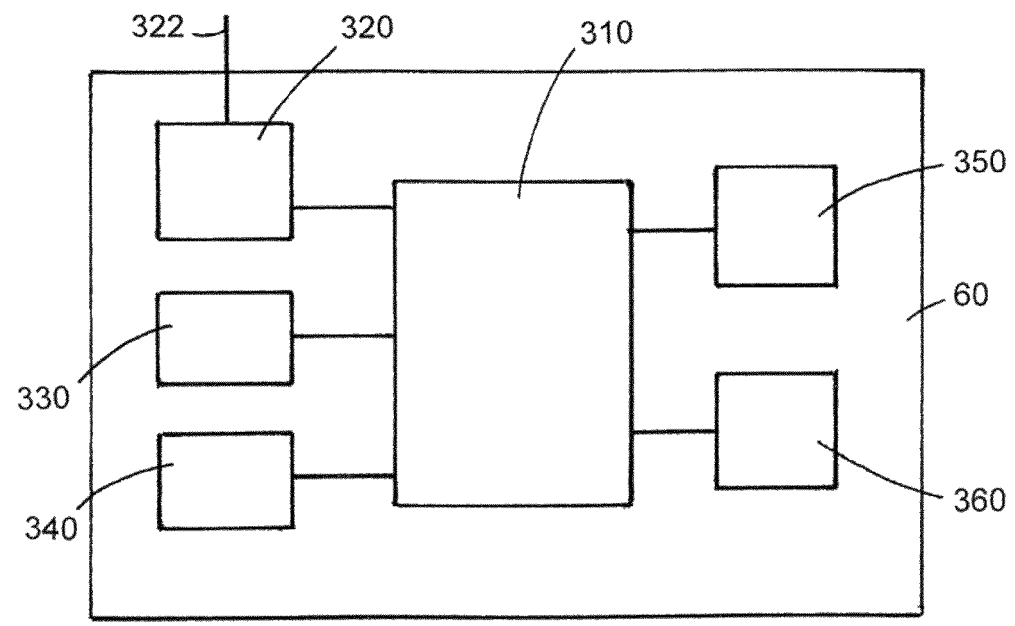
FIG. 5 schematically illustrates an exemplary test device control module, in accordance with the present disclosure.

FIG. 5 schematically illustrates an exemplary test device control module. Computerized test device control module 60 is illustrated, including processor device 310, durable memory storage device 350, communication device 320, sensor data coordination module 330, plunger arm extension module 340, and user input and output module 360.

Processor device 310 includes a computing device known in the art useful for operating programmed code. Device 310 includes RAM memory and can access stored data through connection to memory storage device 350. Memory storage device 350 includes any hard drive, flash drive, or other similar device capable of receiving, storing, and providing access to digital data.

Sensor data coordination module 330 is configured to receive and process information regarding how far a plunger of the connected test device is extended at any time and how much force is being applied through the plunger arm. Force can be measured, for example, by measuring current draw in the motors or by using a stress-strain device such as a wheatstone bridge to measure force in the plunger arm. Plunger arm extension module 340 is configured to control an electrical motor or motors within the connected test device and execute commands to extend or retract the plunger arm.

Processor device 310 includes programming configured to run test processes through the connected test device. Processor device 310 can include all programming required to coordinate input and output from a user, control the test device, control movement of the test device or the mattress, and perform the discloses processes including comparing values of displacement and load between different locations on a surface of the mattress and making the determinations whether a threshold degradation of the mattress has occurred.

Communication device 320 includes any wired or wireless communication system required to receive and transmit information and/or power control to the attached test device and associated machinery.

User input and output module 360 includes circuitry required to operate input and output devices including but not limited to a keyboard input, a touch screen input/output device, a printer, a display screen configured to map softness or firmness values on an illustrated mattress and/or provide test results to the viewer.

Figure 7:
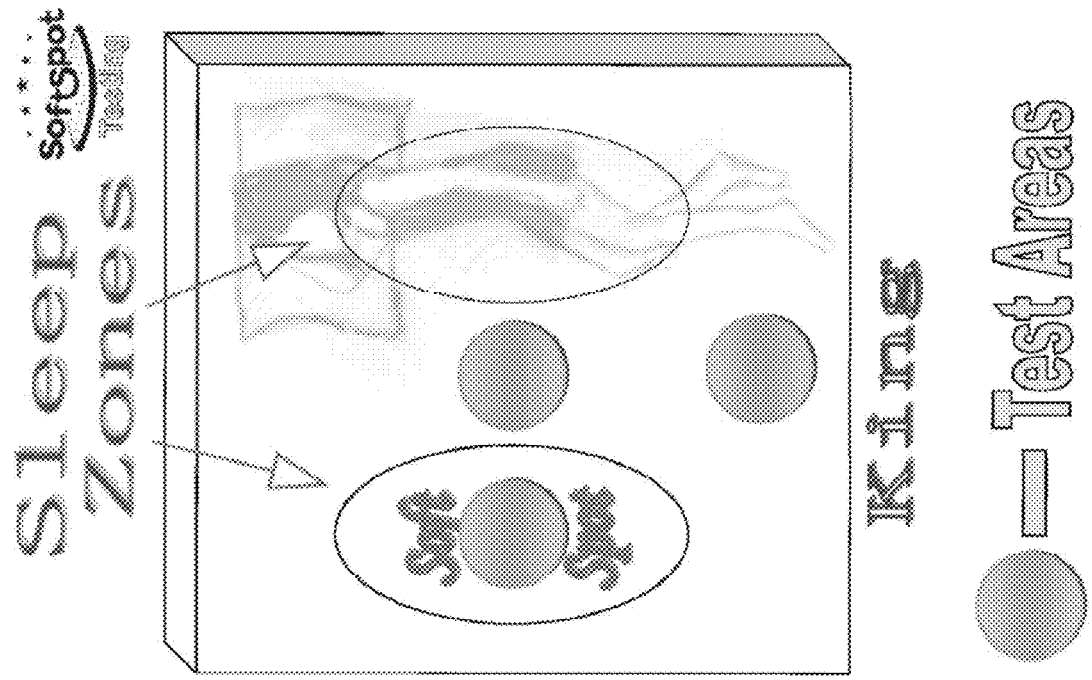
FIGS. 6 and 7 illustrate sleep zones and test areas useful with typical queen and king-sized mattresses, in accordance with the present disclosure.
Figure 6:
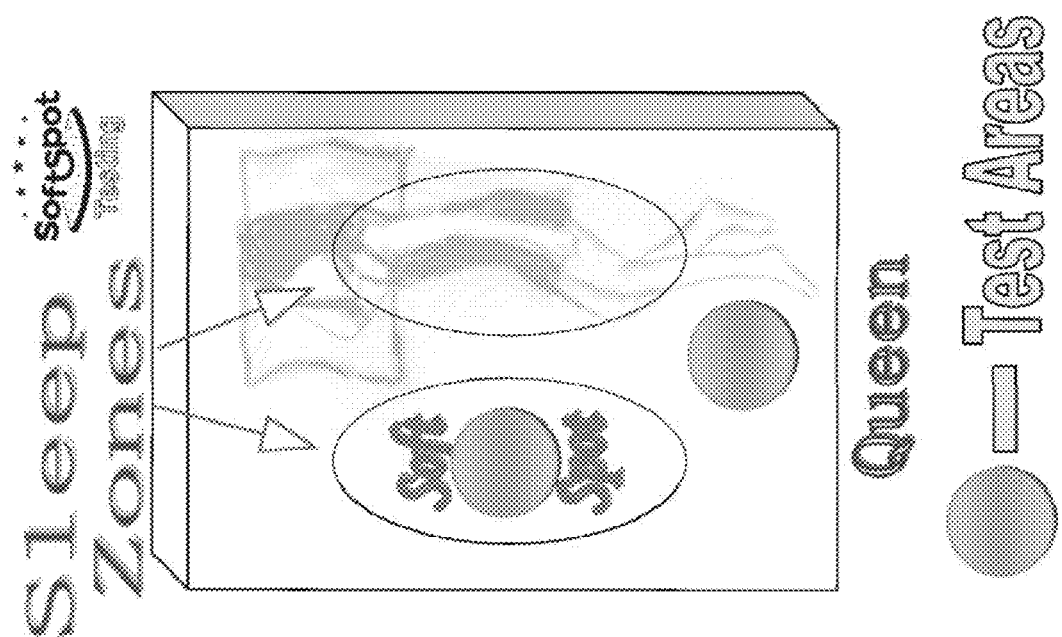

FIGS. 6 and 7 illustrate sleep zones and test areas useful with typical queen and king-sized mattresses. FIG. 6 illustrates an exemplary set of sleep zones and test areas that can be used with a queen mattress. FIG. 6 illustrates information similar to the information included in FIG. 3. FIG. 7 illustrates an exemplary set of sleep zones and test areas that can be used with a king mattress. FIG. 7 illustrates information similar to the information included in FIG. 4.

Figure 8:
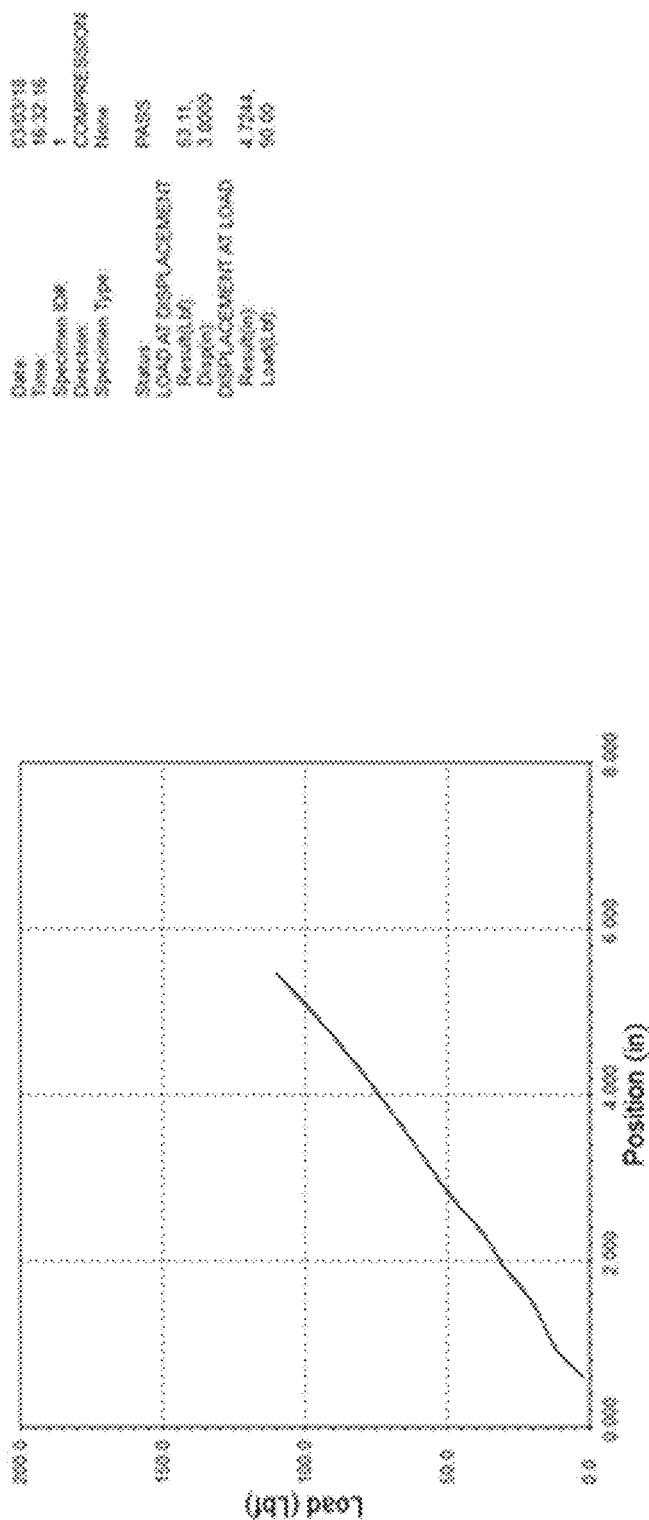
FIGS. 8 and 9 illustrate a typical output screen displaying exemplary mattress test results showing a high wear or worn out mattress, in accordance with the present disclosure.
Figure 9:
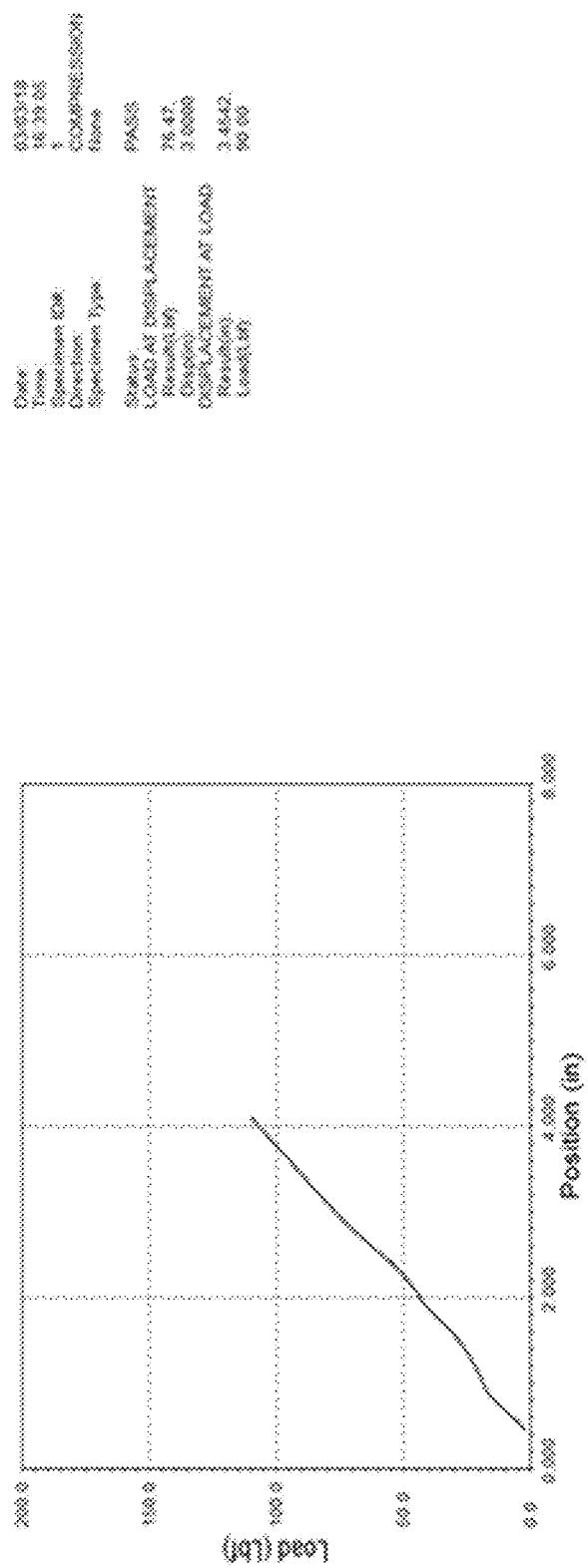

FIGS. 8 and 9 illustrate a typical output screen displaying exemplary mattress test results showing a high wear or worn out mattress. FIG. 8 illustrates test results for an exemplary first mattress including a queen sized mattress testing in a high use "sleep zone." The first mattress includes an eight month old Simmons® brand mattress. The illustrated display includes a two-dimensional plot showing a plurality of load force values on a vertical scale vs. displacement values on a horizontal scale. On a right side of the display, textual data is presented, showing exemplary metrics including a load at a particular displacement (exemplary three inches) and displacement at a particular load (exemplary ninety lbs.)

FIG. 9 illustrates test results for the first mattress including a queen sized mattress testing in a low use zone at a foot of the bed. The illustrated display includes a two-dimensional plot showing a plurality of load force values on a vertical scale vs. displacement values on a horizontal scale. On a right side of the display, textual data is presented, showing exemplary metrics including a load at a particular displacement (exemplary three inches) and displacement at a particular load (exemplary ninety lbs.)

The results of FIGS. 8 and 9 can be compared to evaluate whether the exemplary first mattress is in need of warranty repair or replacement. Either load at a particular displacement or displacement at a particular load can be compared. Comparing displacement at a particular load for the data of FIGS. 8 and 9, the sleep zone in FIG. 8 includes displacement of 4.72 inches at 90 pounds of compression. The foot zone in FIG. 9 includes displacement of 3.45 inches at 90 pounds of compression. Comparing these values, the sleep zone displaces 37% more than the foot zone or exhibits a 37% degradation. Given an exemplary, non-limiting threshold failure value of 20% degradation, the measured 37% degradation of the first mattress provides a test result that the first mattress is in need of warranty repair or replacement.

Figure 10:
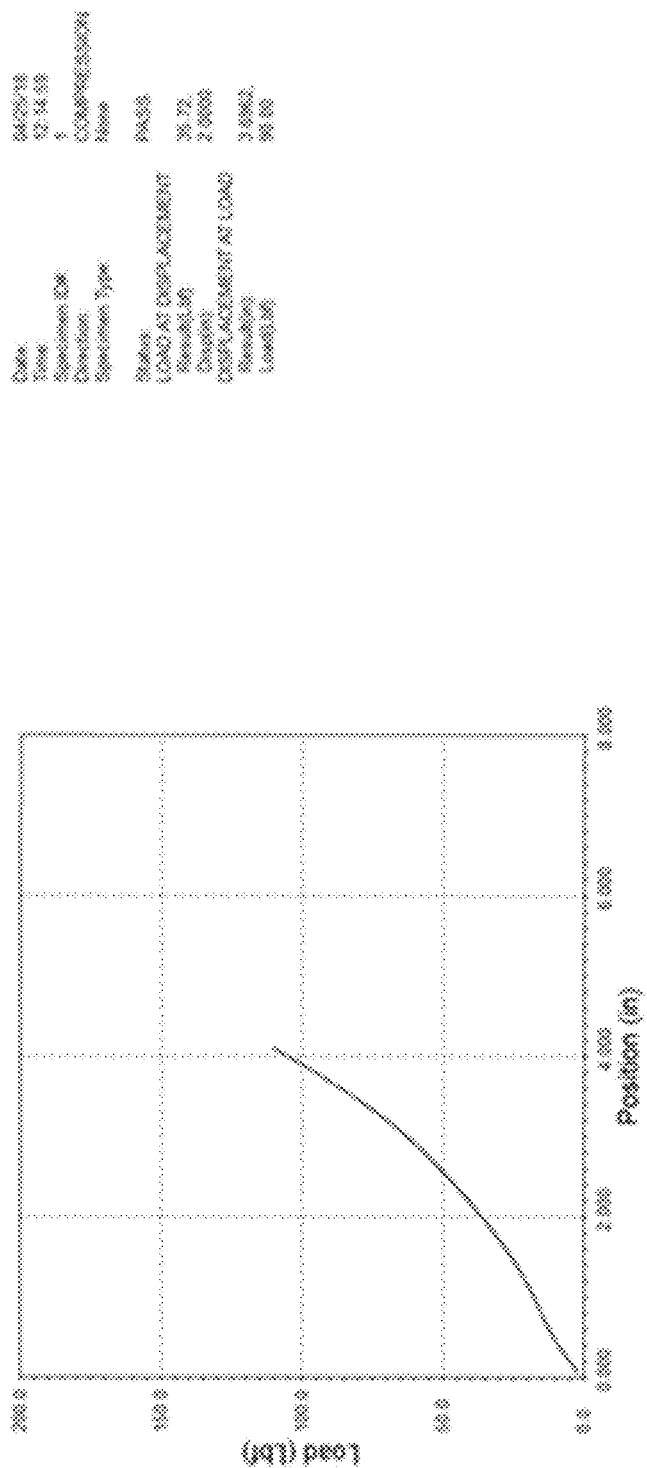
FIGS. 10 and 11 illustrate a typical output screen displaying exemplary mattress test results showing a low wear or still acceptable mattress, in accordance with the present disclosure.
Figure 11:
Figure 11:
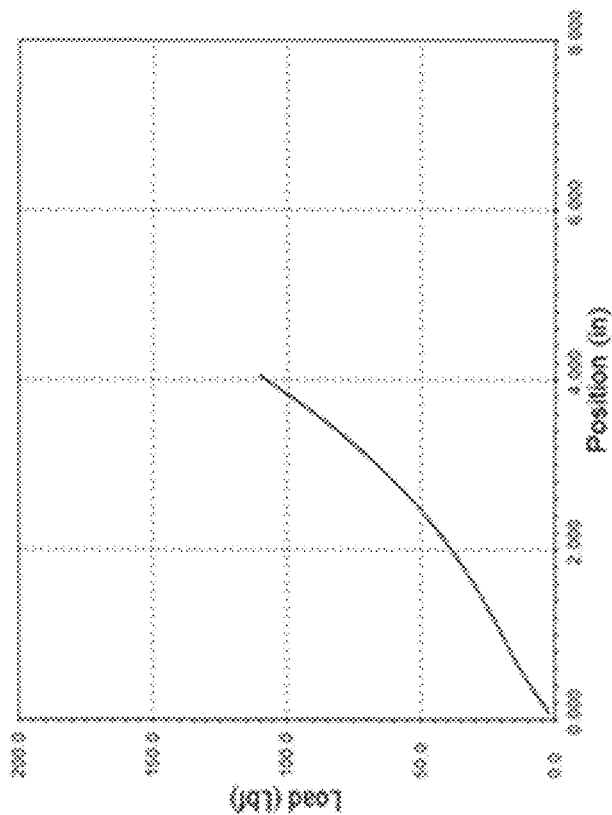

FIGS. 10 and 11 illustrate a typical output screen displaying exemplary mattress test results showing a low wear or still acceptable mattress. FIG. 10 illustrates test results for an exemplary second mattress including a king sized mattress testing in a high use "sleep zone." The second mattress includes a fourteen year old Comfort King® brand mattress. The illustrated display includes a two-dimensional plot showing a plurality of load force values on a vertical scale vs. displacement values on a horizontal scale. On a right side of the display, textual data is presented, showing exemplary metrics including a load at a particular displacement (exemplary three inches) and displacement at a particular load (exemplary ninety lbs.)

FIG. 11 illustrates test results for the second mattress including a king sized mattress testing in a low use zone in a center of the bed in a "hump" zone between two sleep zones. The illustrated display includes a two-dimensional plot showing a plurality of load force values on a vertical scale vs. displacement values on a horizontal scale. On a right side of the display, textual data is presented, showing exemplary metrics including a load at a particular displacement (exemplary three inches) and displacement at a particular load (exemplary ninety lbs.)

The results of FIGS. 10 and 11 can be compared to evaluate whether the exemplary first mattress is in need of warranty repair or replacement. Either load at a particular displacement or displacement at a particular load can be compared. Comparing displacement at a particular load for the data of FIGS. 10 and 11, the sleep zone in FIG. 10 includes displacement of 3.69 inches at 90 pounds of compression. The hump zone in FIG. 11 includes displacement of 3.62 inches at 90 pounds of compression. Comparing these values, the sleep zone displaces 2% more than the foot zone or exhibits a 2% degradation. Given an exemplary, non-limiting threshold failure value of 20% degradation, the measured 2% degradation of the first mattress provides a test result that the second mattress is low wear or still acceptable.

Test values and comparisons in accordance with the present disclosure can measure or determine force as a function of displacement or displacement as a function of force. These determinations and the accompanying criteria are interchangeable, and the disclosure intends both to be applied as equivalents throughout the disclosure.

The disclosed process can be similarly used in relation to single or full sized beds.

FIG. 12 illustrates an exemplary embodiment of the disclosed process to test a mattress in a flow chart. Process 400 starts at step 402. At 404, a location (position and orientation) of the mattress and a size of the mattress (single, full, queen, king) is determined. At step 406, a firmness of the mattress is tested in a high wear sleep zone. At stop 408, the mattress is tested in a low wear zone. At step 410, test values or test data from the two zones are compared. At step 412, it is determined whether the test values indicate that the degradation of firmness in the mattress exhibited by the test values exceeds a threshold value. If the threshold value is exceeded, at step 414, the process indicates that the mattress has reached an end of life wear. If the threshold value is not exceeded, at step 416, the process indicates that the mattress is still acceptable. At step 418, the process ends. The steps of process 400 are provided as non-limiting examples of how the process disclosed herein can be accomplished. It will be understood that process 400 can be used similarly to show that the mattress is in need of a comfort adjustment instead of being at the end of its useful life.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A system for evaluating failure of a used mattress, comprising
   a test device comprising:
      a plunger arm;
      a control motor attached to a first end of the plunger arm and configured to selectively extend and retract the plunger arm; and
      a platen attached to an end of the plunger arm distal from control motor;
   a test device traversing system comprising electronic motors configured to move the test device over different locations on the mattress; and
   a computerized test device control module comprising a computerized processor, operating programming to evaluate the failure of the mattress, the programming comprising:
      controlling extension of the plunger arm at a first location in a heavy use, zone of the mattress and at a second location in a light use, zone of the mattress,
      monitoring depression in the mattress by the plunger win as, a function of force applied by the platen in both the first location and the second location,
      determining a difference between the depression at the first location and the depression at the second, location,
      monitoring a threshold difference value,
      comparing the threshold difference value to the determined difference, and
      generating the result based upon comparing the threshold difference value to the determined difference.

2. A system for evaluating failure of a used mattress, comprising
   a test device comprising:
      a plunger arm;
      a control motor attached to a first end of the plunger arm and configured to selectively extend and retract the plunger arm; and
      a platen attached to an end of the plunger arm distal from control motor;

a test device traversing system comprising electronic motors configured to move the test device over different locations on the mattress; and a computerized test device control module comprising a computerized processor, operating programming to evaluate the failure of the mattress, the programming comprising:

controlling extension of the plunger arm at a first location in a heavy use zone of the mattress and at a second location in a light use zone of the mattres, monitoring force applied to the mattress by the platen, as a function of depression of the mattress by the plunger arm in both the first location and the second location, determining a difference between the force applied at the first location and the force applied at the second location, monitoring a threshold difference value, comparing the threshold difference value to the determined difference, and generating the result based upon comparing the threshold difference value to the determined difference.

3. The system of claim 1, wherein monitoring depression in the mattress by the plunger arm as the function of force applied by the platen comprises monitoring a current draw of the control motor.

4. The system of claim 1, wherein monitoring depression in the mattress by the plunger arm as the function of force applied by the platen comprises monitoring a strain in the plunger arm.

* * * * *